(12) United States Patent
Pefkianakis et al.

(10) Patent No.: US 10,548,147 B2
(45) Date of Patent: Jan. 28, 2020

(54) ACCESS POINT BEAM STRENGTH RANKINGS

(71) Applicant: Hewlett Packard Enterprise Development LP, Houston, TX (US)

(72) Inventors: Ioannis Pefkianakis, Palo Alto, CA (US); Sanjib Sur, Ripon, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,419

(22) Filed: Jan. 31, 2018

(65) Prior Publication Data

US 2019/0239235 A1 Aug. 1, 2019

(51) Int. Cl.
| | | |
|---|---|---|
| H04W 72/08 | (2009.01) | |
| H04W 24/10 | (2009.01) | |
| H04W 72/06 | (2009.01) | |
| H04L 12/26 | (2006.01) | |
| H04W 72/04 | (2009.01) | |
| H04W 24/08 | (2009.01) | |
| H04W 88/08 | (2009.01) | |

(52) U.S. Cl.
CPC .......... *H04W 72/085* (2013.01); *H04L 43/12* (2013.01); *H04W 24/08* (2013.01); *H04W 24/10* (2013.01); *H04W 72/046* (2013.01); *H04W 72/06* (2013.01); *H04W 72/082* (2013.01); *H04W 88/08* (2013.01)

(58) Field of Classification Search
CPC . H04W 72/085; H04W 24/08; H04W 72/082; H04W 72/046; H04W 72/06; H04W 24/10; H04W 88/08; H04L 43/12
See application file for complete search history.

(56) References Cited

U.S. PATENT DOCUMENTS

| | | | |
|---|---|---|---|
| 9,420,507 B2 | 8/2016 | Choi-Grogan et al. | |
| 2007/0232307 A1* | 10/2007 | Ibrahim | H04W 36/30 455/436 |
| 2016/0020876 A1* | 1/2016 | Raghavan | H04W 76/10 370/252 |
| 2016/0066202 A1* | 3/2016 | Dayanandan | H04W 72/0453 370/252 |

(Continued)

OTHER PUBLICATIONS

Network Coding Application for 5G millimeter-wave Communication, by Narasimha et al. (Year: 2015).*

(Continued)

*Primary Examiner* — Dady Chery
(74) *Attorney, Agent, or Firm* — Brooks, Cameron & Huebsch, PLLC

(57) ABSTRACT

Example system may comprise a network controller including a processing resource and instructions executable by the processing resource to: receive, from a first access point in a network, properties of a first millimeter Wave (mmWave) signal path between the first access point and a computing device associated with the first access point; predict, utilizing the properties of the first mmWave signal path, properties of a second mmWave signal path between a second access point in the network and the computing device; predict, utilizing the predicted properties of the second mmWave path, a beam strength for the second access point; and assign a rank to the second access point according to the beam strength.

20 Claims, 3 Drawing Sheets

(56) References Cited

U.S. PATENT DOCUMENTS

| | | | | |
|---|---|---|---|---|
| 2016/0165605 | A1* | 6/2016 | Dimou | H04B 7/0617 |
| | | | | 370/329 |
| 2016/0212680 | A1 | 7/2016 | Talukdar et al. | |
| 2016/0360361 | A1* | 12/2016 | Ross | H04W 4/023 |
| 2018/0123751 | A1* | 5/2018 | Narasimha | H04W 76/10 |

OTHER PUBLICATIONS

"Virtual Cells: The Only Scalable Multi-Channel Deployment", In Meru Networks White Paper, 2005, 8 pages.

Abari et al., "Cutting the Cord in Virtual Reality", HotNets '16 Proceedings of the 15th ACM Workshop on Hot Topics in Networks, 2016, 5 pages.

Abari et al., "Millimeter Wave Communications: From Point-to-Point Links to Agile Network Connections", HotNets 2016—Proceedings of the 15th ACM Workshop on Hot Topics in Networks, 7 pages.

Evensen et al., "Mobile Video Streaming Using Location-based Network Prediction and Transparent Handover", In International Workshop, on Network and Operating Systems Support for Digital Audio and Video (NOSSDAV), 2011, 6 pages.

FCC Promotes Higher Frequency Spectrum for Future Wireless Technology, available online at <https://www.rfglobalnet.com/doc/fcc-frequency-spectrum-future-wireless-technology-0001>, Oct. 22, 2015, 2 pages.

Furman et al., "Unlocking the Promise of Broadband for All Americans", available online at <https://obamawhitehouse.archives.gov/blog/2016/07/15/unlocking-promise-broadband-generate-gains-all-americans>, Jul. 15, 2016, 6 pages.

Halperin et al., "Augmenting Data Center Networks with Multi-gigabit Wireless Links", SIGCOMM '11 Proceedings of the ACM SIGCOMM 2011 conference, 2011, pp. 38-49.

IEEE Standards Association, "IEEE Standards 802.11ad-2012, Amendment 3: Enhancements for Very High Throughput in the 60 GHz Band", 2012, 19 pages.

IEEE Standards Association, "IEEE Standards 802.11ay, Enhancements Throughput for Operation in License-Exempt Bands above 45 GHz", available online at <https://web.archive.org/web/20170308142504/http://www.ieee802.org/11/Reports/tgay_update.htm>, 2017, 10 pages.

Monica Alleven, "Verizon applauds FCC chairman's move to 5G spectrum", available online at <https://www.fiercewireless.com/tech/verizon-applauds-fcc-chairman-s-move-to-5g-spectrum>, Oct. 5, 2015, 4 pages.

News from Qualcomm Incorporated, "Ericsson, Qualcomm and Vodafone Trial 5G New Radio for Unified 5G", Qualcomm Incorporated, available online at <https://www.qualcomm.com/news/releases/2017/02/26/ericsson-qualcomm-and-vodafone-trial-5g-new-radio-unified-5g>, Feb. 27, 2017, 4 pages.

Nicholson et al., "Improved Access Point Selection", MobiSys '06 Proceedings of the 4th international conference on Mobile systems, applications and services, 2006, pp. 233-245.

Pichapati et al., "Location Assisted Handoffs in Dense Cellular Networks", 2014 Eleventh Annual IEEE International Conference on Sensing, Communication, and Networking (SECON), 10 pages.

R. C. Hansen, "Phased Array Antennas", John Wiley & Sons, Inc., 2009, 16 pages.

Rappaport et al., "Millimeter Wave Mobile Communications for 5G Cellular: It Will Work!", IEEE Access, vol. 1, 2013, pp. 335-349.

Rasekh et al., "Noncoherent mmWave Path Tracking", HotMobile '17 Proceedings of the 18th International Workshop on Mobile Computing Systems and Applications, 6 pages.

Song et al., "Wi-Fi Goes to Town: Rapid Picocell Switching for Wireless Transit Networks", 2017, 32 pages.

Sur et al., "60 GHz Indoor Networking through Flexible Beams: A Link-Level Profiling", In Proc. of ACM SIGMETRICS, 2015, 14 pages.

Sur et al., "BeamSpy: Enabling Robust 60 GHz Links Under Blockage", NSDI'16 Proceedings of the 13th Usenix Conference on Networked Systems Design and Implementation, 2016, pp. 193-206.

Sur et al., "WiFi-Assisted 60 GHz Wireless Networks", In Proc. of ACM MobiCom, 2017, 14 pages.

T. S. Rappaport et al., "Millimeter Wave Wireless Communications", Prentice Hall, 2014, 80 pages.

Wang et al., "Beamforming Codebook Design and Performance Evaluation for 60GHz Wideband WPANs", In IEEE VTC, 2009, 11 pages.

Wei et al., "Pose Information Assisted 60 GHz Networks: Towards Seamless Coverage and Mobility Support", In Proc. of ACM MobiCom, 2017, 14 pages.

Zeng et al., "MU-MIMO-Aware AP Selection for 802.11ac Networks", Mobihoc '17 Proceedings of the 18th ACM International Symposium on Mobile Ad Hoc Networking and Computing, 2017, 14 pages.

Zhang et al., "OpenMili: A 60 GHz Software Radio Platform with a Reconfigurable Phased-Array Antenna", MobiCom '16 Proceedings of the 22nd Annual International Conference on Mobile Computing and Networking, 2016, 14 pages.

Zhou et al., "Mirror Mirror on the Ceiling: Flexible Wireless Links for Data Centers", SIGCOMM '12 Proceedings of the ACM SIGCOMM 2012 conference on Applications, technologies, architectures, and protocols for computer communication, 2012, pp. 443-454.

Zhu et al., "Demystifying 60GHz Outdoor Picocells", In Proc. of ACM MobiCom, 2014, 12 pages.

Yi Wang, Wireless Access Point Ranking System, Department of Computer Science National University of Ireland, Cork, A Thesis Submitted for The Degree of Master of Computer Science Sep. 19, 2011, 93 Pos.

* cited by examiner

ACCESS POINT BEAM STRENGTH RANKINGS

BACKGROUND

The millimeter-wave (mmWave) band of radio frequencies may lie between 30 Gigahertz (GHz) and 300 GHz. The radio waves produced in the mmWave radio frequency band may have wavelengths between ten to one millimeter. The radio waves in the mmWave band may be utilized to form data links to transfer data between mmWave transmitters and mmWave receivers. For example, the Wi-Fi standard IEEE 802.11ad operates in the 60 GHz spectrum and achieves data transfer rates as high as seven gigabits per second (Gbit/s).

DETAILED DESCRIPTION

Figure 1:
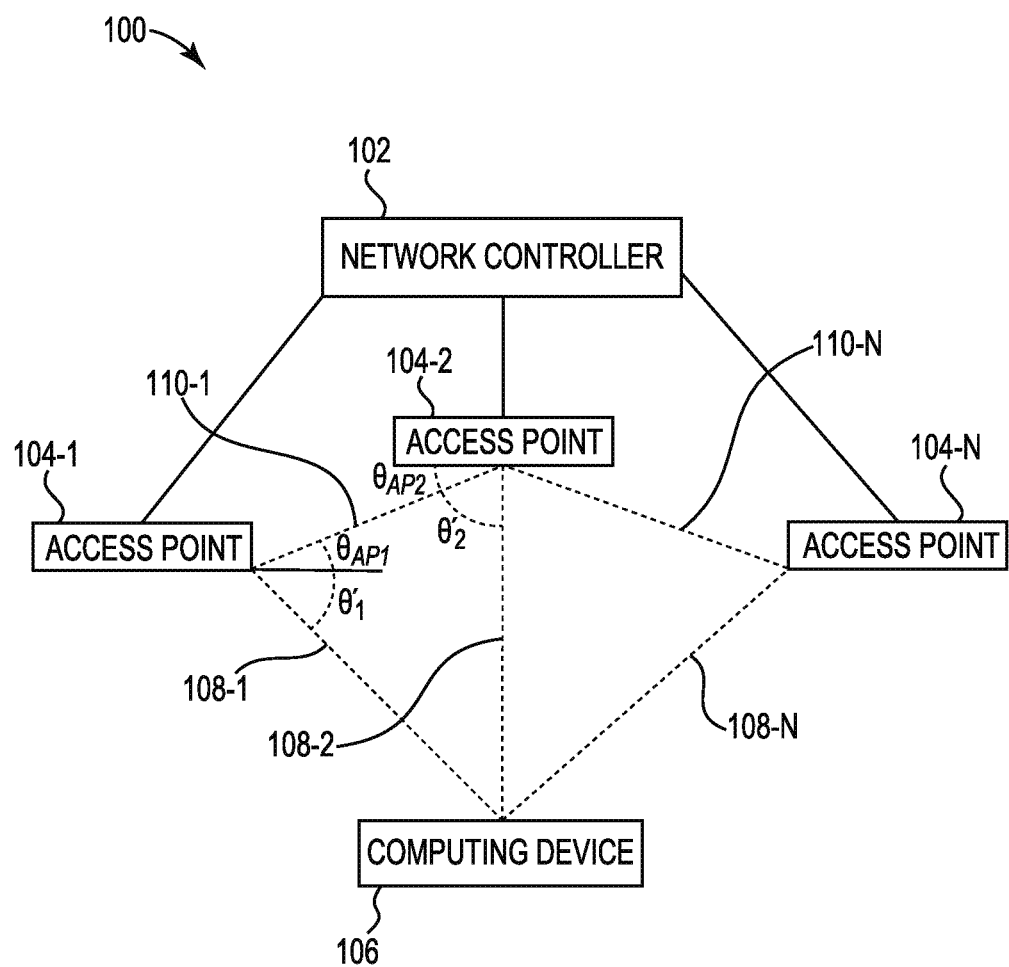
FIG. 1 illustrates an example of a system for access point beam strength rankings consistent with the disclosure.

Compared to lower bands, radio waves in the mmWave band of radio frequencies suffer from increased atmospheric attenuations. For example, the relatively high operating frequency of mmWave band radio waves causes them to be absorbed by gases present in the Earth's atmosphere. As a result, radio waves in the mmWave band of radio frequencies may suffer from path-loss that limits the effective range of the mmWave band radio waves. In an example, a 60 GHz mmWave data transfer link may suffer from 21.6 decibels (dB) higher signal path loss when compared to a 5 GHz Wi-Fi signal under identical environmental conditions.

Signal path loss may degrade or interrupt the transfer of data between a transmitter and a receiver across an mmWave band radio wave data transfer link. For example, an access point (AP) may utilize mmWave band radio waves to establish a data transfer link with a client device. For example, some APs utilize may utilize a IEEE 802.11ad wireless interface operating in the 60 GHz, or V band, spectrum to wirelessly communicate with client devices. Signal path loss of the mmWave band radio waves may degrade or interrupt data communication between the AP and the client.

As used herein, the term "access point (AP)", can, for example, refer to a networking device that allows a client device to connect to a wired or wireless network. An AP can include a processor, memory, and input/output interfaces, including wired network interfaces such as IEEE 802.3 Ethernet interfaces, as well as wireless network interfaces such as IEEE 802.11 wireless interfaces, although examples of the disclosure are not limited to such interfaces. In some examples, the AP can include wireless network interfaces such as IEEE 802.11ad. An AP can include memory, including read-write memory, and a hierarch of persistent memory such as ROM, EPROM, and Flash memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, the term "client device" can, for example, refer to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

In order to address the signal-path loss inherent to the mmWave band radio waves, an AP and/or a client device utilizing mmWave band radio waves may include and/or utilize a phased-array antenna to establish and maintain the mmWave band radio wave data transmission link. A phased-array antenna may include multiple omni-directional antennas that may focus radio frequency energy, such as mmWave band radio waves (mmWaves), towards specific spatial directions. The multiple omni-directional antennas may be electronically steered to point towards specific spatial directions without physically moving the antennas.

The phased-array antennas may produce fine-grained, narrow, and/or highly focused mmWave beams. While these beams may help to compensate for some of the signal-path loss inherent to the mmWaves, the mmWave beams may be susceptible to signal-path loss from mobility (e.g., a change in the location and/or orientation of the AP and/or client device) or from path blockage (e.g., by people or things). For example, a human body present in a 60 GHz mmWave beam path may cause a signal strength drop of between 20 dB and 30 dB. As such, a large computational overhead may be introduced when aligning a beam path between an AP and a client device due to the above described channel dynamics caused by mobility and obstacle blockage. Further, computational demand may be compounded by the large number of possible beam directions that a phased-array antenna may support.

In order to maintain signal strength approaches that search-for and steer-to a highest signal strength beam direction may be utilized by the AP. However, the computational overhead of searching may grow quadratically with the amount of potential beam directions for the phased-array antenna, consuming the valuable Gbps channel time. Further, upon identifying the beam direction, the AP may run a physical layer (PHY) rate adaptation determination. The PHY rate adaptation determination may seek to identify a highest-throughput PHY rate (e.g., Modulation and Coding Scheme (MCS)). An 802.11ad 60 GHz AP may have a convergence time to the highest-throughput beam and PHY rate setting in the order of seconds utilizing these approaches. Such a delay may result in irregular and/or interrupted 60 GHz mmWave data transmission link performance.

Moreover, mmWaves may propagate through line-of-sight paths. When a mmWave data transmission link's line-of-sight path is blocked, the AP may not be able to resolve a mmWave beam path between the AP and a client device.

In contrast, examples of the present disclosure may maintain mmWave network connectivity between a network and a client utilizing a network controller to coordinate cooperation between APs connected to the network. The examples may predict the performance of the APs and rank the APs based on the prediction rather than exhaustive and computationally expensive search-for and steer-to mechanisms across all the APs in the network.

Examples of the present disclosure may include a network controller comprising a processing resource and instructions executable by the processing resource to perform operations. For example, examples of the present disclosure may include a network controller comprising instructions executable by the processing resource to: receive a channel measurement from a first signal path between a first AP in the network and a computing device associated with the first AP; determine, utilizing the channel measurement, properties of the mmWave signal path; predict, utilizing the determine properties, properties of a second path between a second AP in the network and the computing device; determining, utilizing the predicted properties of the second path, a beam strength for the second access point; and assign a rank to the second access point according to the determined beam strength.

FIG. 1 illustrates an example of a system 100 for access point beam strength rankings consistent with the disclosure. The system 100 is not limited to a particular example described herein and may include additional features such as those described in the non-transitory machine-readable storage medium 224 described in FIG. 2 and/or the network controller 340 described in FIG. 3.

The system 100 may include a network controller 102. A network controller 102 may manage devices and operations on a computing network such as a wireless local area network (LAN), wide area network (WAN), etc. For example, a network controller 102, may manage authentication, connection, and communication to and through the computing network. In an example, the network controller 102 may manage and/or coordinate a set of APs 104-1, 104-2, . . . 104-N on the computing network. The network controller 102 may include hardware, such as a processing resource and a memory resource, in addition to instructions executable to perform operations. In some examples, the network controller 102 may be centralized to a server or other network device on the computing network. In other examples, the network controller 102 may be distributed as instructions stored on and/or executable by each of the APs 104-1 . . . 104-N on the computing network.

The system 100 may include a plurality of APs 104-1 . . . 104-N on the computing network. The plurality of APs 104-1 . . . 104-N may share an Ethernet connection. The plurality of APs 104-1 . . . 104-N may operate on a same channel. The plurality of APs 104-1 . . . 104-N may utilize a same wireless basic service set identification (BSSID) and may appear as one AP to a computing device 106. As such, the computing device 106 may only associate and/or authenticate with one AP and the then the computing devices 106 association state with all the other APs 104-1 . . . 104-N may be synchronized to enable seamless roaming of computing device 106 between APs without repeating AP scanning, authentication, and/or association processes.

Each of the plurality of APs 104-1 . . . 104-N may include and/or utilize a phased-array antenna. Each of the plurality of APs 104-1 . . . 104-N may utilize the phased-array antenna to create an mmWave data transfer link with a computing device 106 when the computing device 106 associates with it. The mmWave data transfer link of each of the plurality of APs 104-1 . . . 104-N may be steered along a corresponding mmWave signal path 108-1, 108-2, . . . 108-N. The mmWave signal path 108-1 . . . 108-N may be a line-of-sight signal path. The mmWave signal path 108-1 . . . 108-N may be multiple line-of-sight paths between a respective AP and the computing device 106. The directionality (e.g., direction, azimuth, elevation, and/or angle of projection) of the path 108-1 relative to the first AP 104-1 may be expressed as $\theta'_1$. The directionality of the path 108-2 relative to the second AP 104-2 may be expressed as $\theta'_2$.

The plurality of APs 104-1 . . . 104-N may be located in separate locations of an area where computing network coverage is being supplied. There may be a path 110-1 . . . 110-N between each of the plurality of APs 104-1 . . . 104-N. The path 110-1 . . . 110-N may be a signal path for signals sent between the plurality of APs 104-1 . . . 104-N. Alternatively, the path 110-1 . . . 110-N may not be signal paths, but physical paths between the plurality of APs 104-1 . . . 104-N. Regardless, each of the paths 110-1 . . . 110-N may each have a distance $d_{AP}$ and a direction $\theta_{AP}$ between two corresponding APs of the plurality of APs 104-1 . . . 104-N. The directionality (e.g., direction, azimuth, elevation, and/or angle of projection) of the path 110-1 relative to the first AP 104-1 may be expressed as $\theta_{AP1}$. The directionality of the path 110-1 relative to the second AP 104-2 may be expressed as $\theta_{AP2}$.

The system 100 may include a computing device 106. The computing device 106 may include a client device that associates with one of the plurality of APs 104-1 . . . 104-N at a time to gain access to the computing network. The computing device 106 may include antennas and/or interfaces configured to receive and/or transmit data via a mmWave data transfer link with an AP. The computing device 106 may include a laptop computer, a desktop computer, a mobile computing device, smart phone, tablet computer, and/or other wireless devices.

As described above, the APs 104-1 . . . 104-N may include a phased-array antenna including an mmWave radio utilizing phased-array beamforming to focus radio frequency energy at the computing device 106. For a one-dimensional linear phased-array antenna, the gain pattern of the $m^{th}$ beam may be expressed as:

$$A_m(\theta) = \sum_{n=1}^{N} w(n, m) \cdot e^{(j2\pi n d\cos\theta/\lambda)} \qquad \text{Eq. 1}$$

where N is the number of antenna elements with uniform separation d and $\lambda$ is the wavelength of the wireless signal generated by the antenna. The weights w(n,m) may be tuned to generate different beams with diverse radiation patterns. APs 104-1 . . . 104-N may utilize a two dimensional phased-array antenna, and thus may generate a radiation pattern in both azimuth and elevation direction denoted by $A_m(\theta^{az}, \theta^{el})$. Beam radiation patterns of the mmWave beams may have an irregular shape due to discrete configuration weights. However, for each beam, the beam pattern $A_m$ may be fixed during the time of design of the AP. As such, the pattern $A_m$ may be known to and/or saved at the AP and/or the network controller 102.

The AP's signal can reach the computing device 106 through a plurality of distinct paths. The plurality of distinct paths may be expressed as K. The mmWave channel created by the $m^{th}$ mmWave transmit beam may be determined by $$h_m = \sum_{k=1}^{K} \Sigma_\theta A_m(\theta) \cdot g_k(\theta_k) \cdot \delta(\theta - \theta_k) \qquad \text{Eq. 2}$$

where $g_k(\theta_k)$ denotes the complex channel gain of the $k^{th}$ path towards directions $\theta_k$. The gain $g_k$ may equal $a_k e^{j\phi_k}$ for path amplitude $a_k$ and phase $\phi_k$. The performance of a mmWave beam may depend on its spatial alignment with the K paths of the mmWave channel, and such alignment may be determined by a Dirac delta function $\delta(\theta-\theta_k)$. Each of the mmWave signal transmission paths may traverse both azimuth ($\theta_k^{az}$) and elevation ($\theta_k^{el}$) directions. Thus, the $k^{th}$ path may be fully characterized by a 4-tuple in the form of ($a_k$, $\phi_k$, $\theta_k^{az}$, $\theta_k^{el}$). Since the beam pattern $A_m$ may be known a priori, the network controller 102 may predict a strongest mmWave beam without scanning through an entire space.

As such, the network controller 102 may be able to rank alternative APs (e.g., 104-2 and 104-N) in the vicinity of a computing device 106 that is utilizing a particular AP (e.g., 104-1) for data transmission without additional probing. For example, when the line-of-sight between any AP and the computing device 106 is open, then the mmWave beams performance primarily depend on it. Thus, by estimating the gain and direction of a dominant signal path (e.g., 108-2) between an alternative AP (e.g., 104-2) and the computing device 106, the potential link performance of an AP may be predicted without probing the mmWave channel along the dominant signal path.

Further, a first line-of-sight dominating path (108-1) between a first AP (e.g., 104-1) and the computing device 106, a second line-of-sight dominating path (108-2) between a second AP (104-2) and the computing device 106, and a path 110-1 between the first AP 104-1 and the second AP 104-2 may form a virtual triangle in space. Therefore, the network controller may geometrically estimate the gain and direction of the dominating line-of-sight path from the alternative AP (e.g., 104-2) without probing it.

The first access point 104-1 may collect the channel measurement by probing M mmWave beams with a probing packet. Collecting the channel measurement may include sending the packet from the first AP 104-1 to the computing device 106 in a mmWave beam along the mmWave signal path 108-1. The computing device 106 may make channel measurements based on the packet that it received. The computing device 106 may transmit the channel measurements to the first AP 104-1. The first AP 104-1 may receive the channel measurements back from the computing device 106. The channel measurement may include a channel impulse response (CIR) measurement of the channel.

The channel measurement may be taken for each beam of a first portion of beams available at the first AP 104-1. A channel measurement of the $m^{th}$ beam may take the form given in Eq. 2.

The first AP 104-1 may determine, utilizing the channel measurement, properties of the first mmWave signal path 108-1. Determining the properties of the first mmWave signal path 108-1 may include determining a path-characterizing four-tuple of the first mmWave signal path 108-1. The four-tuple may include a path amplitude ($a_k$) of the first mmWave signal path 108-1. The four-tuple may include a path phase ($\phi_k$) of the first mmWave signal path 108-1. The four-tuple may include an azimuth direction ($\theta_k^{az}$) of the first mmWave signal path 108-1. The four-tuple may include an elevation direction ($\theta_k^{el}$) of the first mmWave signal path 108-1.

The complex gain (e.g., $a_k$, $\phi_k$) of the first mmWave signal path 108-1 may not be distinctly measureable without knowledge of the directions (e.g., $\theta_k^{az}$, $\theta_k^{el}$) that the first mmWave signal path traversed. For example, the channel measurement of the $m^{th}$ beam may capture the information about the gain of the path convoluted with the complex gain of the beam pattern as described in Eq. 2. Therefore, while the radiation pattern of each mmWave beam available at the first AP 104-1 is known and/or fixed a priori, the beam gain used to amplify the first mmWave signal path 108-1 may depend on the unknown direction (e.g., $\theta_k^{az}$, $\theta_k^{el}$) of the path.

The 4-tuple of properties of the first mmWave signal path 108-1 remains the same across channel measurements from other mmWave beams available at the first AP 104-1. However, the amplification gain of the first mmWave signal path 108-1 due to different radiation patterns may change across channel measurements from different mmWave beams. As such, the four-tuple of properties may be determined utilizing a dual-space time analysis of the collected channel measurements. For example, the contribution of the $m^{th}$ beam on the $k^{th}$ path can be expressed as an amplification model:

$$P_{(m,k)} = A_m(\theta_k^{az}, \theta_k^{el}) \cdot a_k e^{(j\Phi_k)}. \quad \text{Eq. 3}$$

In an example, the channel measurement of the $K^{th}$ mmWave signal path from the measured channel of the $m^{th}$ beam may be given by $P_{(m,k)}^c$. However, there may be many possible directions of the mmWave signal path which can have similar amplitude and phase responses after amplification by the mmWave beam pattern. By collecting channel measurements from the additional 4K mmWave beams of the first portion of beams that amplify the same physical path, the first AP 104-1 may be able to extract the 4-tuple of the $K^{th}$ path. For example, if the channel measurements from M beams are available at the first AP 104-1, then the 4-tuple of the $K^{th}$ path may be extracted from the optimization:

$$\{a_k, \Phi_k, \theta_k^{az}, \theta_k^{el}\} *= \underset{\{a_k, \Phi_k, \theta_k^{az}, \theta_k^{el}\}}{\operatorname{argmin}} \|\{P_{(m,k)} - P_{(m,k)}^c\}_{m=1}^M\|^2 \quad \text{Eq. 4}$$

$$\text{s.t.} -\pi \leq \Phi_k \leq \pi, \ 0 < a_k \leq \frac{\max|P_{(m,k)}^c|}{\min|A_m|} \ \forall \ m \in [1, M]$$

where the bound on the mmWave signal transmission path phase and amplitude are fixed during the Eq. 4 solver time. The upper bound on the amplitude $a_k$ may be determined based on the ratio between the measured amplitude and the absolute normalized minimum strength of the $m^{th}$ mmWave beam. Since $A_m$ ($\theta^{az}$, $\theta^{el}$) for each mmWave beam may be measured with a finite resolution on the azimuth and elevation angle, the Eq. 4 method may be non-convex and constrained over the discrete grid of directions ($\theta_k^{az}$, $\theta_k^{el}$). A genetic algorithm method with mixed integer constraints may be applied and local minima convergence may be addressed by applying a random variable initialization and multiple seed generation. Eq. 4 may be solved by the first AP 104-1 for each of K mmWave signal paths and K may be bounded to two or three dominating signal paths.

As such, the first AP 104-1 may utilize the above-described operations to computationally extract the properties (e.g., the 4 tuple) of the $K^{th}$ path from the channel measurements from M mmWave beams available at the first AP 104-1. For example, the first AP 104-1 may extract the properties of the first mmWave signal path 108-1 from a channel measurement along the first mmWave signal path 108-1. The extracted properties may include an estimated gain $g_1$ and estimated direction el of the line-of-sight of the first mmWave signal path 108-1. For example, the estimated gain $g_1$ may equal $a_1 e^{j\Phi_1}$ for path amplitude $a_1$ and phase $\phi_1$. The estimated direction $\theta_1$ may include azimuth ($\theta_k^{az}$) and elevation ($\theta_k^{el}$) directions. Thus, the properties of the first mmWave signal path 108-1 may represent a 4-tuple in the form of ($a_1$, $\phi_1$, $\theta_1^{az}$, $\theta_1^{el}$).

The network controller 102 may receive the properties of the first mmWave signal path 108-1 from the first AP 104-1.

For example, the first AP 104-1 may transmit the properties to the network controller 102 once they have been extracted from the channel measurement. The first AP 104-1 may periodically perform the channel measurement and report the properties to the network controller 102 responsive to detecting a change in the signal-to-noise ratio (SNR) for the channel. For example, when the SNR for the channel measured by the first AP 104-1 changes by a particular magnitude or amount and/or crosses a SNR threshold, the AP 104-1 may transmit the properties of the first mmWave signal path 108-1 from the first AP 104-1.

The network controller 102 may predict the properties of a second mmWave signal path 108-2 between a second access point 104-2 in the network and a computing device 106. The properties of the second mmWave signal path 108-2 may be predicted utilizing the properties of the first mmWave signal path 108-1 received at the network controller 102. The properties of the second mmWave signal path 108-2 may be predicted by the network controller 102 without probing along the second mmWave signal path 108-2 or any additional mmWave signal paths 108-N.

The network controller 102 may utilize the estimated gain $g_1$ and estimated direction $\theta_1$ to predict the properties by extrapolating a line-of-sight signal path (e.g., 108-2 and 108-N) from each of the other M−1 APs (e.g., 104-2 and 104-N) and the computing device 106, again, without probing the other line-of-sight signal paths (e.g., 108-2 and 108-N) and/or without utilizing channel measurements from each of the other M−1 APs (e.g., 104-2 and 104-N). For example, from the estimated gain $g_1$ and estimated direction $\theta_1$ of the first line-of-sight signal path 108-1, the network controller 102 may estimate the distance $d_1$ between the first AP 104-1 and the computing device 106 as $d_1=\sqrt{\alpha/g_1}$. Here, a may be equal to the transmit power of the first AP 104-1. The relative distance $d_{ap}$ (e.g., the distance of the paths 110-1 or 110-N) between each of the APs 104-1 . . . 104-N may be known a priori as a configured known variable set at network deployment time and/or saved at the network controller 102.

The network controller 102 may mathematically construct a virtual triangle between the first AP 104-1, the second AP 104-2, and the computing device 106 from the estimated distance $d_1$ between the first AP 104-1 and the computing device 106 and the estimated relative distance $d_{ap}$ (e.g., the distance of the paths 110-1) between first AP 104-1 and the second AP 104-2. For example, the network controller 102 may estimate the distance $d_2$ and the relative angle $\theta'_2$ between the second AP 104-2 and the computing device 106 as:

$$d_2 = \sqrt{d_1^2 + d_{AP}^2 - 2d_1 \, d_{AP} \, \cos(\theta'_1)}, \quad \frac{d_2}{\sin(\theta'_1)} = \frac{d_1}{\sin(\theta'_2)} \quad \text{Eq. 5}$$

where $\theta'_1=\theta_1+\theta_{AP1}$. The network controller 102 may determine the gain and direction of the second line-of-sight signal path 108-2 from the second AP 104-2 to the computing device 106 as:

$$g_2 = \alpha d_2^2, \; \theta_2 = 180° - \theta'_2 - \theta_{AP} \quad \text{Eq. 6}$$

The mathematically constructed triangle may lie in a three-dimension (3D) space, since the first and second mmWave signal paths 108-1 and 108-2 have two directional components (azimuth $\theta^{az}$ and $\theta^{el}$). The determinations may be extended to account for the 3D cases.

The network controller 102 may utilize the estimated gain $g_2$ and estimated directionality $\theta_2$ of the second line-of-sight signal path 108-2 to predict the dominant channel of all N beams from the second AP 104-2 to the computing device 106 by utilizing Eq. 2. The network controller 102 may repeat the same operations with respect to other access points (e.g., 104-N) in the network.

The network controller 102 may predict a beam strength for the second access point 104-2. The predicted beam strength may be a predicted beam strength of a mmWave beam data transfer link between the second AP 104-2 and the computing device 106 along a line-of-sight signal path 108-2 characterized by the corresponding predicted properties. As such, the predicted beam strength for the second access point 104-2 may be predicted utilizing the predicted properties of the second mmWave path 108-2. For example, for each beam available at the second AP 104-2, the beam pattern $A_m$, including the azimuth and elevation radiation patterns of the beam, are known a priori and fixed during hardware design time. Therefore, by determining the estimated gain $g_2$ and estimated directionality $\theta_2$ of the dominant second line-of-sight signal path 108-2 for all beams, the network controller 102 may estimate a beam strength distribution profile for the N beams available at the second AP 104-2. Likewise, the network controller 102 may repeat the same operations with respect to other access points (e.g., 104-N) in the network to determine the predictive beam strength profile for the other access points (e.g., 104-N) to the computing device, denoted as $P(AP_m)$.

The network controller 102 may assign a rank to the second access point 104-1 according to the beam strength. Assigning a rank to the second access point 104-2 may include assigning the second access point 104-2 an order in an ordered list of access point (e.g., including 104-2 and 104-N) in the network that the computing device 106 is not associated with. The rank may reflect the predicted beam strength of the access point relative to the other access points. For example, the access points near the top of the ordered list may include those access points that are predicted to have a relatively higher SNR associated with their predicted dominant mmWave beam channel that those access points near the bottom of the ordered list. The ordered list may be sorted in an order of descending predicted SNR. As such, the ordered list may provide a list of candidate APs for the computing device 106 to associate with in the event that the CIR of the established channel between the computing device 106 and the access point that it is currently associated with crosses and SNR value threshold. The access points ranked near the top of the ordered list may represent "better" candidate APs since they have higher predicted SNR values.

The ranking $R(AP_m)$ of the access point $AP_m$ may be determined based on the average of the median and maximum predicted beam strength as follows:

$$R(AP_m) = \frac{\tilde{P}(AAP_m) + \max(P(AP_m))}{2} \quad \text{Eq. 7}$$

where $\tilde{P}(AP_m)$ denotes the median of $P(AP_m)$. This ranking may be utilized to sort the M APs in the vicinity of the computing device 106 and keep track of a ranking of the candidate APs.

The ranking may assume that each of the access points (104-2 and 104-N) has a single open line-of-sight signal path (e.g., 108-2 and 108-N) to the computing device 106. Thus, an absolute ranking when some line-of-sight signal paths are blocked may not be resolvable. However, the potential impact of blocked signal paths may be alleviated by the network controller 102 by picking the first M' highest ranked APs from the ranked ordered list of APs and estimating their performance by probing them utilizing any means of beam selection. A small amount of M' probing, such as M'=3 probing, may provide AP accurate resolution to an AP providing a relatively highest SNR beam even with blocked signal paths.

The network controller 102 may utilize other network conditions when ranking APs or selecting candidate APs to connect to a computing device 106 from the ranked APs. For example, the network controller 102 may adjust rankings based on the proximity of the APs to the computing device 106 and/or a vicinity of the computing device 106. The network controller 102 may also adjust rankings based on additional metrics such as traffic load at each AP. For example, APs with relatively higher network traffic loads may be moved down in the rankings, whereas APs with relatively lower network traffic loads may be moved up in the rankings.

In some examples, mmWave beam connectivity may not be achievable where the mmWave beams of a network's APs in a vicinity of the computing device 106 are blocked (e.g., the computing device's 106 phased-array antenna is covered by a user's hand). Likewise, an AP that the computing device 106 is currently associated with may host pending packets for the computing device 106. The pending packets may be dropped if the signal path between the currently associated AP and the computing device's 106 is blocked. In order to address such blockage incidents, the APs may utilize multi-band chipsets in a session transfer mechanism. For example, when a mmWave AP to computing device 106 data transfer length SNR crosses an SNR signal threshold value (e.g., an SNR signal threshold value that can no longer support an IEEE 802.11ad's MCS 1) the currently associated AP and/or the network controller 102 may work together to re-buffer the packets from the currently associated AP's 60 GHz chipset's queue to a Wi-Fi queue of the AP. Such a session transfer may facilitate an uninterrupted transmission from the currently associated AP without dropping any packets while the network controller 102 determines another mmWave AP to transmit future packets from.

Figure 2:
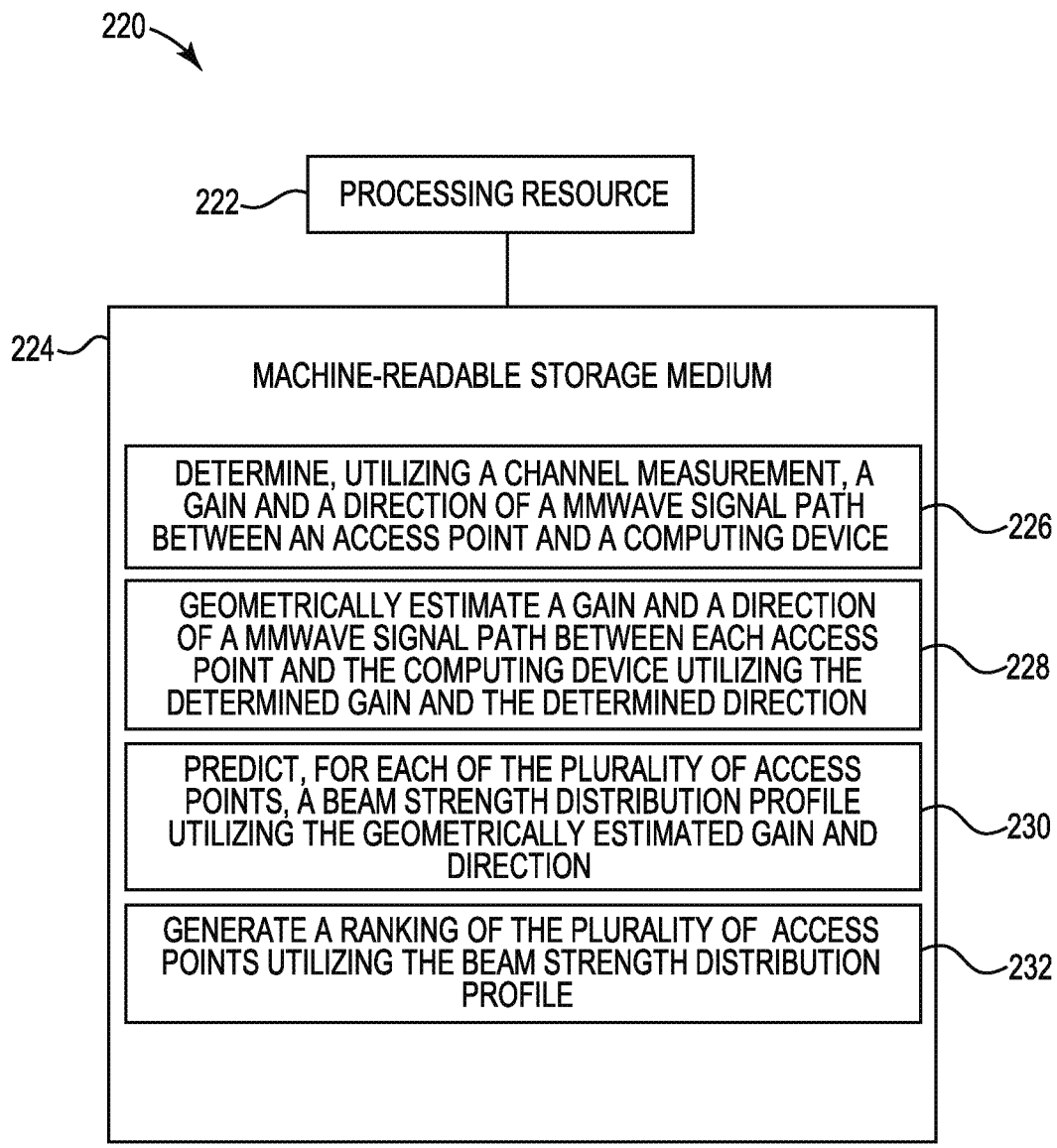
FIG. 2 illustrates a diagram of an example of a processing resource and a non-transitory machine-readable medium for access point beam strength rankings consistent with the disclosure.

FIG. 2 illustrates a diagram 220 of a processing resource 222 and a non-transitory machine-readable medium 224 for access point beam strength rankings consistent with the disclosure. A memory resource, such as the non-transitory machine-readable medium 224, may be used to store instructions (e.g., 226, 228, 230, 232) executed by the processing resource 222 to perform the operations as described herein. The operations are not limited to a particular example described herein and may include additional operations such as those described in the system 100 described in FIG. 1 and the network controller 340 described in FIG. 3.

A processing resource 222 may execute the instructions stored on the non-transitory machine readable medium 224. The non-transitory machine-readable medium 224 may be any type of volatile or non-volatile memory or storage, such as random access memory (RAM), flash memory, read-only memory (ROM), storage volumes, a hard disk, or a combination thereof.

The machine-readable medium 224 may store instructions 226 executable by the processing resource 222 to determine a gain and a direction of a line-of-sight mmWave signal path between an access point in a network and a computing device associated with the access point. The gain and direction may be extracted from a channel measurement of a channel along the line-of-sight mmWave signal path. In an example, the AP may collect a channel impulse response (CIR) collected by probing with packets sent to the computing device along the line-of-sight mmWave signal path between the access point and the computing device associated with the access point. The gain and direction of the path may be extracted from the CIR in combination with known beam profiles stored at the AP.

The machine-readable medium 224 may store instructions 228 executable by the processing resource 222 to geometrically estimate line-of-sight paths between each of the APs in the network that are not associated with the computing device and the computing device itself. Geometrically estimating the line-of-sight paths may include utilizing a triangulating operation to estimate a gain and a direction of each of the respective line-of-sight mmWave signal paths. The geometric estimation may be done without performing a probing or a channel measurement of the respective line-of-sight mmWave signal paths.

For example, when a line-of-sight signal path between an AP and a computing device is open, the performance of the beams' of the AP may be determined by the properties of the signal path. Thus, by estimating the gain and the direction of the dominant path a potential link performance may be predicted for a corresponding AP. Additionally, the line-of-sight signal paths between two APs in the network and the computing device may form a virtual triangle in space. As such, a network controller may geometrically estimate the gain and direction of the dominating line-of-sight path from a second AP without probing it. Therefore, a potential link performance for the second AP may be estimated based on the geometrically estimated gain and direction of the line-of-sight signal path between the second AP and the computing device.

The machine-readable medium 224 may store instructions 230 executable by the processing resource 222 to predict, for each of the plurality of access points in the network, a beam strength distribution profile. The beam strength distribution profile may be predicted utilizing the geometrically estimated gain of the line-of-sight mmWave signal path and the geometrically estimated direction of the line-of-sight mmWave signal path between each access point and the computing device. Additionally, the beam strength distribution profile may be predicted utilizing a radiation profile of each of the mmWave beams available at the corresponding AP.

A median beam strength and a maximum beam strength may be extracted from a corresponding beam strength distribution file of each of the plurality of access points that are not associated with the computing device. An average of the median beam strength and a maximum beam strength may be determined for each of the plurality of access points of the network.

The machine-readable medium 224 may store instructions 232 executable by the processing resource 222 to generate a ranking of the plurality of access points that are not associated with the computing device. The ranking may be generated utilizing the predicted beam strength distribution profile. Generating the ranking may include ranking each of the plurality of APs not associated with the computing device according to the average of the median beam strength and the maximum beam strength for each of the plurality of access points. Generating the ranking may include sorting the plurality of access points not associated with the computing device by a corresponding SNR of each of the plurality of access points.

Figure 3:
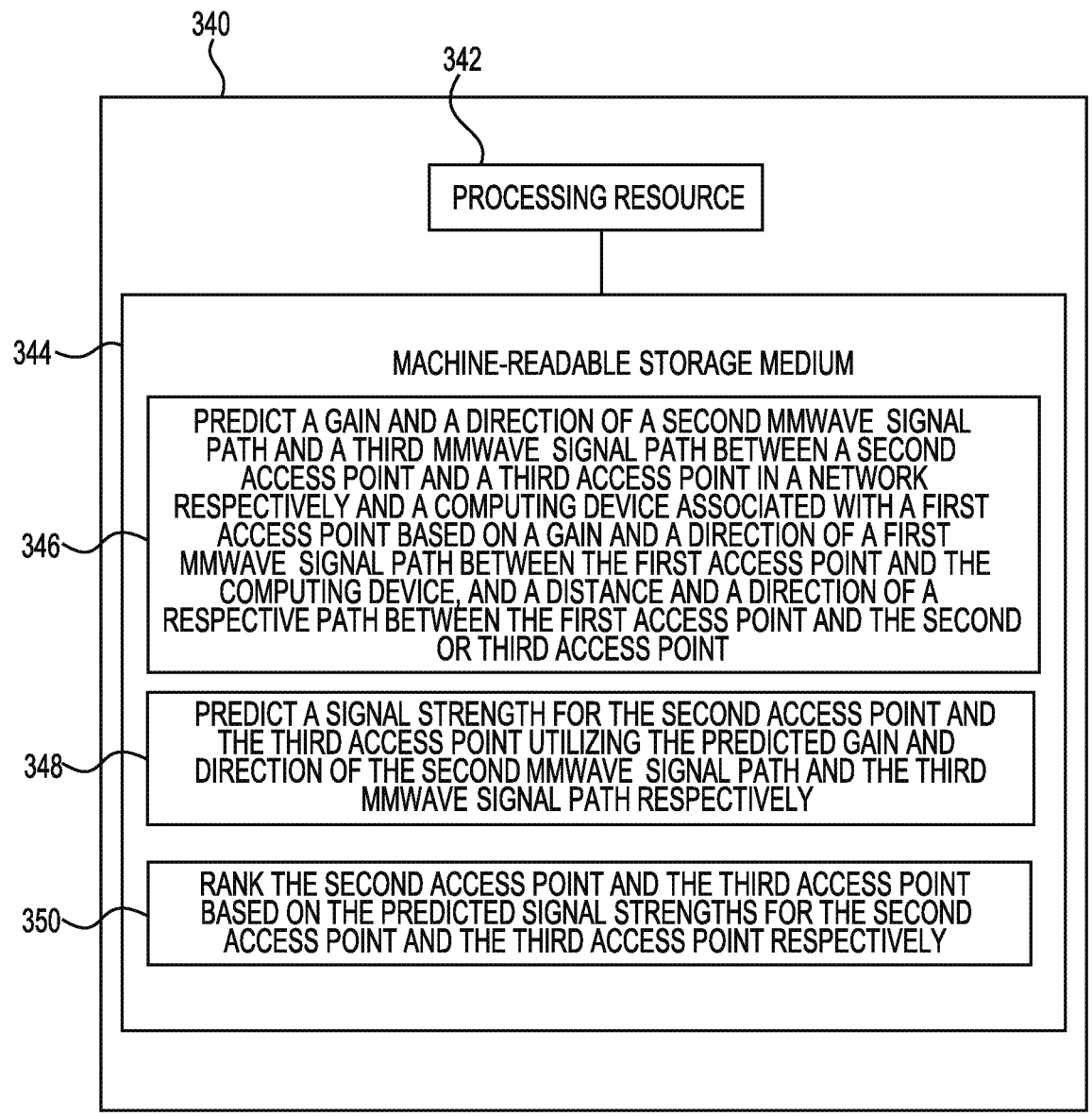
FIG. 3 illustrates a diagram of an example of a network controller for access point beam strength rankings consistent with the disclosure.

FIG. 3 illustrates a diagram of a network controller 340 for access point beam strength rankings consistent with the disclosure. The network controller 340 may include a memory resource, such as the non-transitory machine-readable medium 344, may be used to store instructions (e.g., 346, 348, 350, 352, 354) executed by the processing resource 342 to perform the operations as described herein. The operations are not limited to a particular example described herein and may include additional operations such as those described in the system 100 described in FIG. 1 and the machine-readable medium 224 described in FIG. 2.

A processing resource 342 may execute the instructions stored on the non-transitory machine readable medium 344. The non-transitory machine-readable medium 344 may be any type of volatile or non-volatile memory or storage, such as random access memory (RAM), flash memory, read-only memory (ROM), storage volumes, a hard disk, or a combination thereof.

The machine-readable medium 344 may store instructions 346 executable by the processing resource 342 to predict a gain and a direction of a second mmWave signal path and a third mmWave signal path between a second access point and a third access point in a network respectively and a computing device associated with a first access point based on a gain and a direction of a first mmWave signal path between the first access point and the computing device, and a distance and a direction of a respective path between the first access point and the second or third access point. For example, a gain and a direction of a second mmWave signal path between a second AP in a network and a computing device associated with a first AP may be predicted. The gain and the direction of the second mmWave signal path may be predicted based on a gain and a direction of a first mmWave signal path between the first AP and the computing device. Additionally, the gain and the direction of the second mmWave signal path may be predicted based on a distance and a direction of a path between the first access point and the second access point.

The gain and the direction of the second mmWave signal path may be predicted without probing along the second mmWave signal path. Instead, the gain and the direction of the second mmWave signal path may be predicted by utilizing the gain and the direction of the first mmWave signal path extracted from a probe of the first mmWave signal path and the spatial relationship between the first AP and the second AP, which is established at the time of network setup. Since the first AP, the second AP, and the computing device may form a virtual triangle, the known gain and the direction of the first mmWave signal path and the known distance and a direction of a path between the first access point and the second access point may be utilized to solve for the gain and the direction of the second mmWave signal path as the unknown side of the virtual triangle.

Additionally, predict a gain and a direction of a third mmWave signal path between a third access point in the network and the computing device may be predicted. As with the second mmWave signal path, the gain and the direction of the third mmWave signal path may be predicted based on the gain and the direction of the first mmWave signal path between the first access point and the computing device. Additionally, the gain and the direction of the third mmWave signal path may be predicted based on a distance and a direction of a path between the first access point and the third access point.

The gain and the direction of the third mmWave signal path may be predicted without probing along the third mmWave signal path. Instead, the gain and the direction of the third mmWave signal path may be predicted by utilizing the gain and the direction of the first mmWave signal path extracted from a probe of the first mmWave signal path and the spatial relationship between the first AP and the third AP, which is established at the time of network setup. Since the first AP, the third AP, and the computing device may form a virtual triangle, the known gain and the direction of the first mmWave signal path and the known distance and a direction of a path between the first access point and the third access point may be utilized to solve for the gain and the direction of the third mmWave signal path as the unknown side of the virtual triangle.

The machine readable medium 344 may store instructions 348 executable by the processing resource 342 to predict a signal strength for the second access point and the third access point utilizing the predicted gain and direction of the second mmWave signal path and the third mmWave signal path respectively. For example, a signal strength for the second access point may be predicted. The predicted signal strength for the second access point may include a predicted SNR of an mmWave beam along a predicted dominant signal path between the second access point and the computing device. The predicted signal strength may be predicted utilizing the predicted gain and predicted direction of the second mmWave signal path between the second access point in the network and the computing device. By referencing known radiation patterns for each beam available at the second AP against the predicted gain and predicted direction of the second mmWave signal path, a beam strength distribution profile for the second access point may be predicted.

Additionally, a signal strength for the third access point may be predicted. The predicted signal strength for the third access point may include a predicted SNR of a mmWave beam along a predicted dominant signal path between the third access point and the computing device. The predicted signal strength may be predicted utilizing the predicted gain and predicted direction of the third mmWave signal path between the third access point in the network and the computing device. By referencing known radiation patterns for each beam available at the third AP against the predicted gain and predicted direction of the third mmWave signal path, a beam strength distribution profile for the third access point may be predicted.

The machine readable medium 344 may store instructions 350 executable by the processing resource 342 to rank the second AP and the third AP. The second AP and the third AP may be ranked based on the predicted signal strengths for the second AP and the third AP respectively. The second AP and the third AP may be ranked in descending order of predicted SNR. The ranking may serve as a reference of which AP to switch to if the SNR of a current connection between an AP and the computing device crosses a threshold SNR value.

The first AP, which is associated with the computing device, may periodically capture CIR measurements and determine a SNR of communications between the first AP and the computing device. The first AP may detect that an SNR of communication between the first access point and the computing device has dropped below a threshold SNR amount and send an indication to that effect to the network controller 340. Upon receiving the indication, the network controller 340 may instruct the second access point to probe the second mmWave signal path between the second access point in the network and the computing device when the second access point is ranked higher than the third access point. The second access point may probe the second mmWave signal path and determine a CIR for the path. The second access point may report the CIR for the path to the network controller 340. The network controller 340 may adjust the rank of the second AP and/or the third AP path based on the result of the probe. For example, if the probe reveals a relatively lower SNR for the second mmWave signal path than is predicted for the third mmWave signal path and/or reveals that the second mmWave signal path is blocked, then the second AP may be re-ranked lower that the third AP.

Other metrics may be utilized to adjust the rank of the APs. For example, the rank of the first and/or second AP may be adjusted based on a traffic load at the first AP and/or a traffic load at the third AP. In an example, APs with less traffic load may be ranked higher than those that have more traffic load despite the APs with more traffic load potentially having a higher predicted SNR. In an example, once the traffic load at a particular AP crosses a traffic load threshold, the AP may be re-ranked accordingly.

As described above, packets that are buffered at an access point may be dropped if the mmWave beam between the access point and the computing device is interrupted. However, when a network controller 340 receives and indication that a SNR of communication between the first AP and the computing device has crossed a threshold SNR amount, the network controller 340 may re-buffer the packets in danger of being dropped. For example, the network controller 340 may buffer the packets that are buffered at the first AP to the second AP when the second AP is ranked higher than the third AP. The network controller 340 may handoff the computing device to the second AP and the second AP may provide the packets to the computing device.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A system comprising:
    a network controller including a processing resource and instructions executable by the processing resource to:
        receive, from a first access point in a network, properties of a first millimeter Wave (mmWave) signal path between the first access point and a computing device associated with the first access point;
        predict properties of a second mmWave signal path between a second access point in the network and the computing device utilizing the properties of the first mmWave signal path and without probing a corresponding mmWave channel along a dominant signal path;
        predict, utilizing the predicted properties of the second mmWave path, a beam strength for the second access point; and
        assign a rank to the second access point according to the beam strength.

2. The system of claim 1, wherein the first access point utilizes a phased-array antenna to transmit signals to the computing device.

3. The system of claim 1, wherein the first millimeter Wave (mmWave) signal path comprises a line of sight path between the first access point in the network and the computing device receiving the signal from the first access point.

4. The system of claim 1, wherein the properties of the second mmWave signal path between the second access point in the network and the computing device are predicted without probing the second mmWave signal path.

5. The system of claim 1, wherein the properties of the first mmWave signal path are extracted from a channel measurement of the first mmWave signal path.

6. The system of claim 5, wherein the properties include a path amplitude of the first mmWave signal path.

7. The system of claim 5, wherein the properties include a path phase of the first mmWave signal path.

8. The system of claim 5, wherein the properties include an azimuth direction of the first mmWave signal path.

9. The system of claim 5, wherein the properties include an elevation direction of the first mmWave signal path.

10. The system of claim 1, including the instructions executable by the processing resource to predict a dominant channel of a plurality of beams available at the second access point.

11. A non-transitory machine-readable storage medium having stored thereon machine-readable instructions to cause a processor to:
    determine, utilizing a channel measurement, a gain and a direction of a line of sight millimeter wave (mmWave) signal path between an access point in a network and a computing device associated with the access point;
    geometrically estimate, for each of a plurality of access points in the network, a gain and a direction of a line of sight mmWave signal path between the each access point and the computing device by utilizing the determined gain and the determined direction of the line of sight mmWave signal path between the each access point in the network and the computing device associated with the access point;
    predict, for each of the plurality of access points in the network that are not associated with the computing device, a beam strength distribution profile utilizing the geometrically estimated gain and the geometrically estimated direction of the line of sight mmWave signal path between the each access point and the computing device; and
    generate a ranking of the plurality of access points that are not associated with the computing device by utilizing the beam strength distribution profile.

12. The medium of claim 11, including instructions to cause the processor to:
    extract a median beam strength and a maximum beam strength for each of the plurality of access points from a corresponding beam strength distribution profile; and determine an average of the median beam strength and the maximum beam strength for each of the plurality of access points.

13. The medium of claim 12, wherein the instructions to generate the ranking include instructions to rank each of the plurality of access points according to the average of the median beam strength and the maximum beam strength for each of the plurality of access points.

14. The medium of claim 11, wherein the instructions to generate the ranking include instructions to sort the plurality of access points by a signal-to-noise-ratio (SNR) of each of the plurality of access points.

15. The medium of claim 11, wherein the channel measurement is a channel impulse response collected by probing the line of sight millimeter wave (mmWave) signal path between the access point in the network and the computing device associated with the access point.

16. The medium of claim 11, wherein the computing device is not associated with the plurality of access points and the plurality of access points operates on a same channel.

17. A network controller comprising:
a processing resource; and
instructions executable by the processing resource to:
  predict a gain and a direction of a second mmWave signal path and a third mmWave signal path between a second access point and a third access point in a network respectively and a computing device associated with a first access point based on a gain and a direction of a first mmWave signal path between the first access point and the computing device, and a distance and a direction of a respective path between the first access point and the second or third access point, wherein the second access point and the third access point are not associated with the computing device;
  predict a signal strength for the second access point and the third access point utilizing the predicted gain and direction of the second mmWave signal path and the third mmWave signal path respectively; and
  rank the second access point and the third access point based on the predicted signal strengths for the second access point and the third access point respectively.

18. The network controller of claim 17, the network controller comprising the instructions executable by the hardware processor to:
  receive an indication that a signal to noise ratio of communications between the first access point and the computing device has dropped below a threshold amount;
  instruct the second access point to probe the second mmWave signal path between the second access point in the network and the computing device when the second access point is ranked higher than the third access point;
  adjust the rank based on a result of the probe.

19. The network controller of claim 17, the network controller comprising the instructions executable by the hardware processor to:
  receive an indication that a signal to noise ratio of communications between the first access point and the computing device has dropped below a threshold amount;
  buffer packets buffered at the first access point to the second access point when the second access point is ranked higher than the third access point; and
  handoff the computing device to the second access point.

20. The network controller of claim 17, the network controller comprising the instructions executable by the hardware processor to:
  adjust the rank based on a traffic load at the second access point and a traffic load at the third access point.

* * * * *